Patented Sept. 6, 1932

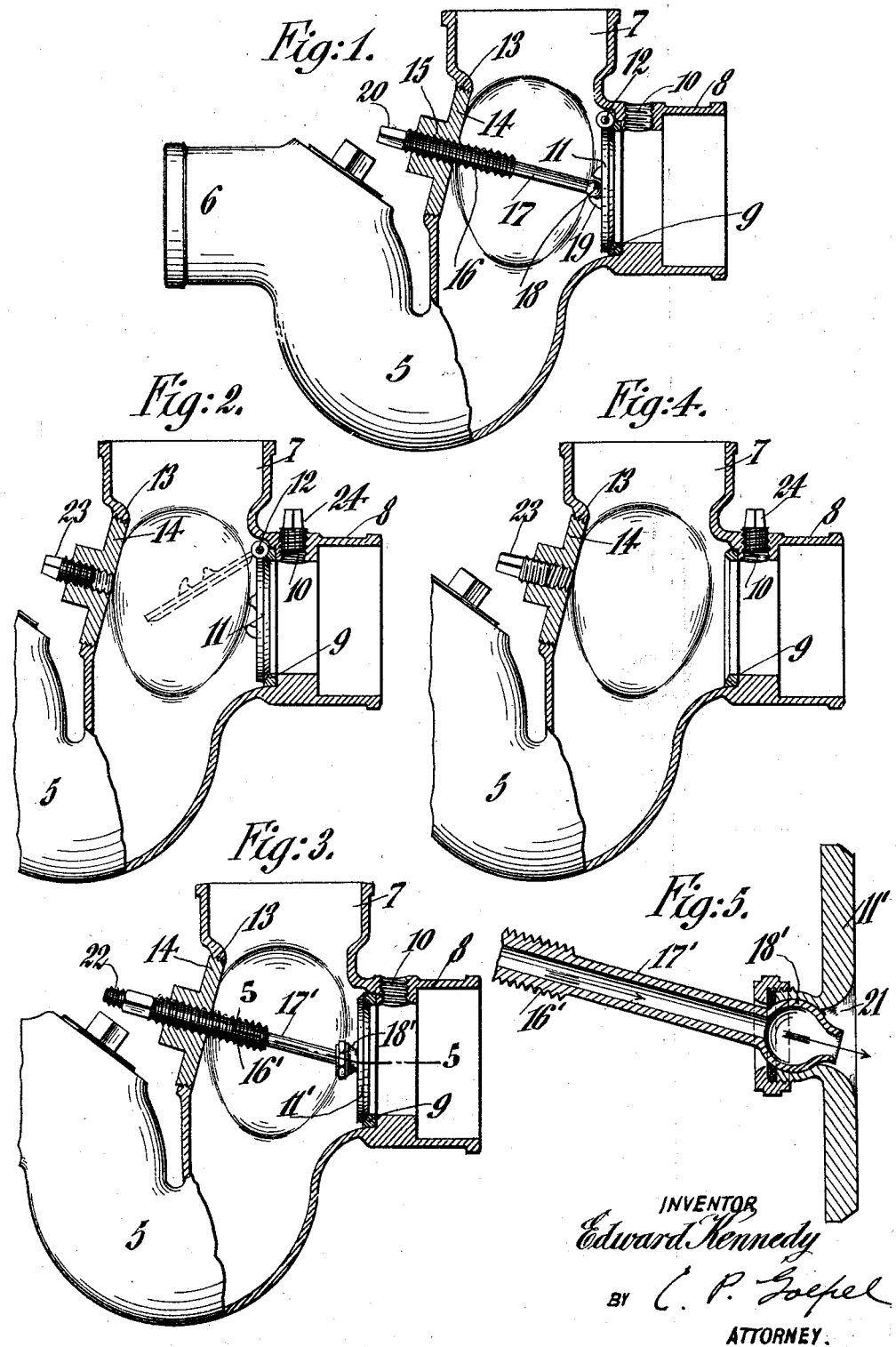

1,875,615

UNITED STATES PATENT OFFICE

EDWARD KENNEDY, OF NEW YORK, N. Y., ASSIGNOR TO THE KENNEDY-STEINER CORPORATION, OF BRONX COUNTY, NEW YORK

COMBINED TRAP AND TEST FITTING

Application filed February 21, 1929. Serial No. 341,710.

This invention relates to a combined trap and test fitting, and has for its general object and purpose to provide a device of this kind for use in connection with the plumbing system of a house or building whereby the passage through the trap may be closed and the piping filled with water to test the same and ascertain that said piping is entirely free of any obstructions which would impede the flow of water to the sewer connection.

It is also another object of the invention to provide a suitable valve for closing the connection between the trap and the house piping together with means removably supported in an opposite wall of the trap for tightly closing said valve against its seat.

It is also an additional object of the invention in one form thereof to provide said valve and its adjusting means in the form of a single unit so that the valve and the adjusting means therefor may both be removed from the trap after the test is completed, and said adjusting means including a conduit section by means of which water may be supplied under pressure through the valve to the house piping.

With the above and other objects in view, the invention consists in the improved combination trap and test fitting and in the form, construction and relative arrangement of its several parts as will be hereinafter more fully described, illustrated in the accompanying drawing, and subsequently incorporated in the subjoined claims.

In the drawing, wherein I have illustrated one simple and practical embodiment of my invention, and in which similar reference characters designate corresponding parts throughout the several views,—

Figure 1 is a side elevation partly in section illustrating one practical embodiment of the device;

Fig. 2 is a similar view, the valve adjusting means being removed, and the valve shown in dotted lines in open position;

Fig. 3 is a view similar to Fig. 1 showing a slightly modified form of the invention;

Fig. 4 is a sectional view of the construction illustrated in Fig. 3, the valve together with adjusting means therefor, having been removed from the trap, and Fig. 5 is an enlarged detail section taken on the line 5—5 of Fig. 3.

Referring in detail to the drawing, 5 generally indicates the usual cast metal house trap having the hub extensions 6, 7 and 8 for the connection therewith of the sewer outlet, the fresh air inlet, and the house piping respectively. At the inner end of the hub extension 8 a valve seat 9 is provided and outwardly of this valve seat and adjacent thereto a threaded opening 10 is formed in the upper side of the hub wall. This opening, normally is closed by means of a suitable plug. At the upper side of the valve seat 9 a flap valve 11 is pivoted as indicated at 12.

The wall of the trap opposite to the valve seat 9 is preferably obliquely inclined and provided with a threaded opening indicated at 13 to receive the closure plate 14. This plate is centrally provided with an external hub extension and a threaded bore 15. This bore receives the threaded section 16 of the valve adjusting rod 17. This rod at its inner end terminates in a semi-spherical head 18 which is removably engaged in a concave seat 19 centrally formed on the face of the flap valve 11. At its outer end, the rod 17 has a square or rectangular section 20 for the application of a wrench thereto. It will be apparent that by the adjustment of this rod in the plate 14, the valve 11 may be forced tightly upon its seat to prevent any flow of the water from the house piping through the trap 5.

In the use of the above device, in making the test after the trap has been installed, the valve 11 is first forced tightly to its closed position against the seat 9. The faucets are then opened permitting the water to run freely and fill the entire piping system. When the water collects above the basin drains and overflows through the opening 10, the system is full. Such overflow indicates that the pipe lines are free of obstruction. The faucets are then closed and the valve adjusting rod 17 is unthreaded from its connection with the plate 14 and entirely removed. The water pressure immediately forces valve 11 to the open position indicated in dotted lines in Fig. 2 of the drawing so that the water may freely drain from the house piping through the trap 5 into the sewer.

In the above embodiment of the invention, the valve 11 is permanently mounted in the trap, and being comparatively light in weight will readily swing to the open position upon any appreciable pressure of water against the same from the house piping. However, in the event of back pressure through the sewer connection and the trap, such water pressure will act against the opposite side of the valve and force the same to its closed position, thereby preventing such backing up of the water extending through the house piping, and possibly flooding the premises.

In Figs. 3, 4 and 5 of the drawing, I have shown an alternative embodiment of the device not having the feature last described, and in which the valve, as well as its adjusting means are removed from the trap, after the test is completed. In this case, the valve plate or disc 11' at the center thereof has a universal swivel connection with the adjusting member 17'. As herein shown, this connection is in the form of a conventional ball and socket joint 18'. Preferably, the member 17' is in the form of a rigid metal tube or conduit having the threaded portion 16' for engagement in the opening in the plate 14 in the manner above described, said conduit having one open end thereof at the ball and socket connection 18' disposed within the opening 21 of the valve disc or plate 11'. To the other end of the combined adjusting and conduit member 17', a tube or other connection indicated at 22 from a source of water under pressure is adapted to be coupled.

In the use of this form of the invention, the plate 14' is first threaded upon the section 16' of the conduit member 17' and the valve disc 11' is then inserted through the opening 13 in the trap wall and engaged with the seat 9. The plate 14 is then adjusted and threaded into the opening 13, after which the member 17' is adjusted in said plate to force the valve disc 11' tightly against the seat 9, thus effectually sealing the connection between the trap and the house plumbing. Water under pressure is then admitted through the tube connection 22 and the member 17' and through valve 11' to the house piping, said supply being continued until the water rises above the drains of the plumbing fixtures or overflows through the opening 10. Thus this device may be employed for testing purposes before the water supply piping and the faucets have been installed. After the test is completed, the plate 14 is then unthreaded from the wall of the trap so that the valve disc 11' together with the adjusting member 17' therefor can be withdrawn through the opening 13. Plate 14 is then detached from the member 17' and again threaded into the opening 13. The central bore in this plate is closed by means of a suitable plug shown at 23, and as indicated in Fig. 2 of the drawing, the opening 10 is closed by means of a similar plug 24.

From the foregoing description considered in connection with the accompanying drawing, the construction, manner of use and several advantages of the device will be clearly and fully understood. It will be seen that I have provided a combined house trap and test fitting which is of simple and inexpensive construction and whereby the plumbing system can be easily and quickly tested. In cases, where there is no danger of the water backing up through the sewer, the form of the device as shown in Figs. 3 and 4 will always be employed, since by the entire omission of the test valve, the completely unretarded flow of the water into the trap from the house plumbing is permitted. I have shown several embodiments of the device, which I believe to be entirely practical and capable of easy application and use in connection with standard plumbing systems. However, to meet certain exigencies which might arise it may be necessary to make certain structural modifications in the form of the trap or the several other parts of the device. It will therefore, be understood that in practice I reserve the privilege of adopting all such legitimate changes in the form, construction and relative arrangement of the several detail elements which may be fairly embodied within the spirit and scope of the invention as claimed.

I claim:

1. A combination trap and test fitting for plumbing systems including a trap body having a hub extension for connection with the house piping, a valve seat at the inner end of said hub extension, a valve disc to engage said seat and close the connection between the house piping and the trap, said valve disc having a central opening therethrough, the wall of the trap body opposed to said valve seat being obliquely inclined and provided with a threaded opening, a closure plate for said opening, a rigid conduit section detachably threaded in said closure plate, and said conduit section at one of its ends being in open communication with said opening in said valve disc and having a universal ball and socket connection with said disc whereby water may be supplied to the plumbing system through said conduit section, said section being adjustable to tightly seal the valve against its seat, and said closure plate for the opening in the body wall of the trap, the valve disc and said adjustable conduit section being removable as a unit through said opening with respect to the trap body.

2. A combination trap and test fitting for plumbing systems including a U-shaped trap body, one leg thereof being provided at its upper end with a clean out opening and with a lateral hub extension for connection with the sewer piping, the other leg of the trap body at its upper end having a lateral hub extension for connection with the house piping and a clean out opening in its wall opposite said hub extension, a valve seat at the inner end of said hub extension, a valve disc to engage said seat and close the connection between the house piping and the trap, said valve disc having a central opening therethrough, a rigid conduit section having one end thereof in open communication with said opening in the valve disc, a universal ball and socket connection between said end of the conduit section and said disc whereby water may be supplied to the plumbing system through said conduit section, said disc and conduit section being removable as a unit through the latter clean out opening of the trap body, and detachable closure members for said clean out openings.

In testimony that I claim the foregoing as my invention, I have signed my name hereto.

EDWARD KENNEDY.